US008964519B2

(12) United States Patent
Hosaka

(10) Patent No.: US 8,964,519 B2
(45) Date of Patent: Feb. 24, 2015

(54) OPTICAL INFORMATION RECORDING AND REPRODUCTION DEVICE, OPTICAL INFORMATION RECORDING DEVICE, METHOD FOR RECORDING AND REPRODUCING OPTICAL INFORMATION AND OPTICAL INFORMATION RECORDING MEDIUM

(75) Inventor: Makoto Hosaka, Tokyo (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 14/239,715

(22) PCT Filed: Apr. 16, 2012

(86) PCT No.: PCT/JP2012/060250
§ 371 (c)(1),
(2), (4) Date: Feb. 19, 2014

(87) PCT Pub. No.: WO2013/046775
PCT Pub. Date: Apr. 4, 2013

(65) Prior Publication Data
US 2014/0160913 A1 Jun. 12, 2014

(30) Foreign Application Priority Data

Sep. 30, 2011 (JP) ................................. 2011-216004

(51) Int. Cl.
*G11B 7/0065* (2006.01)
*G03H 1/18* (2006.01)

(52) U.S. Cl.
CPC .............. *G11B 7/0065* (2013.01); *G03H 1/181* (2013.01); *G03H 1/182* (2013.01); *G03H 2001/185* (2013.01)

USPC .......................................................... 369/103

(58) Field of Classification Search
None
See application file for complete search history.

(56) References Cited

U.S. PATENT DOCUMENTS

| 4,440,586 | A | * | 4/1984 | Lippits et al. ................. 156/151 |
| 5,155,719 | A | * | 10/1992 | Masakawa ................. 369/47.52 |
| 7,065,035 | B1 | * | 6/2006 | Mizuuchi et al. ............. 369/283 |
| 7,158,273 | B2 | * | 1/2007 | Stadler et al. ..................... 359/3 |
| 7,622,245 | B2 | * | 11/2009 | Cuttner ........................ 430/321 |
| 8,000,205 | B2 | * | 8/2011 | Hori et al. ..................... 369/103 |
| 8,000,206 | B2 | * | 8/2011 | Hossfeld et al. ............. 369/103 |
| 2006/0077852 | A1 | * | 4/2006 | Tateishi et al. ................. 369/103 |
| 2006/0153054 | A1 | * | 7/2006 | Kobayashi et al. ........ 369/275.1 |
| 2006/0187795 | A1 | * | 8/2006 | Redfield et al. ............... 369/103 |
| 2006/0238841 | A1 | | 10/2006 | Anderson et al. |
| 2006/0280096 | A1 | * | 12/2006 | Riley et al. .................... 369/103 |

(Continued)

FOREIGN PATENT DOCUMENTS

JP 06-084762 A 3/1994
JP 2004-272268 A 9/2004

(Continued)

*Primary Examiner* — Peter Vincent Agustin
(74) *Attorney, Agent, or Firm* — Volpe and Koenig, P.C.

(57) ABSTRACT

The present invention provides a technology which estimates the most suitable cure time which changes with the environment when recording a hologram and adjusts the cure time in real time, thereby enabling a suitable pre-cure or post-cure. When irradiating an optical information recording medium with cure light, the light transmitted from the optical information recording medium is detected by a detector and the irradiation time is adjusted by continuing irradiation until the intensity of the transmitted light detected exceeds a prescribed reference value.

12 Claims, 14 Drawing Sheets

(56) References Cited

U.S. PATENT DOCUMENTS

| | | |
|---|---|---|
| 2008/0088896 A1 | 4/2008 | Toishi |
| 2008/0253257 A1* | 10/2008 | Stallinga .................. 369/103 |
| 2008/0310281 A1* | 12/2008 | Hara et al. ................ 369/103 |
| 2009/0080313 A1* | 3/2009 | Shimada et al. ........... 369/103 |
| 2009/0103416 A1* | 4/2009 | Smith et al. ............... 369/103 |
| 2009/0219798 A1* | 9/2009 | Tanaka et al. ............. 369/103 |
| 2009/0257337 A1 | 10/2009 | Ogata |
| 2010/0315931 A1* | 12/2010 | Hossfeld et al. ........... 369/103 |

FOREIGN PATENT DOCUMENTS

| | | |
|---|---|---|
| JP | 2006-243241 A | 9/2006 |
| JP | 2008-097704 A | 4/2008 |
| JP | 2009-252339 A | 10/2009 |
| WO | 2004/102542 A1 | 11/2004 |

\* cited by examiner

OPTICAL INFORMATION RECORDING AND REPRODUCTION DEVICE, OPTICAL INFORMATION RECORDING DEVICE, METHOD FOR RECORDING AND REPRODUCING OPTICAL INFORMATION AND OPTICAL INFORMATION RECORDING MEDIUM

CROSS-REFERENCE TO RELATED APPLICATIONS

This application claims the benefit of priority from Japanese Patent Application No. 2011-216004, filed Sep. 30, 2011, the entire contents of which are incorporated herein by reference.

TECHNICAL FIELD

The present invention relates to a device, a method, and a medium for recording or reproducing information onto or from an optical information recording medium by using holography.

BACKGROUND ART

At the present time, it is possible to commercialize an optical disc having a recording density of approximately 100 GB for the people's livelihood as well owing to Blu-ray Disc™ standards using a blue-violet colored semiconductor laser. In the future, a large capacity exceeding 500 GB is desired in optical discs as well. For implementing such an ultra-high density in optical discs, however, a density increasing technique using a new system different from the conventional density increasing technique using a shorter wavelength and a high NA is needed.

Among studies conducted concerning storage techniques, the hologram recording technique for recording digital information by utilizing holography attracts attention. As for the hologram recording technique, for example, there is JP-A-2004-272268 (Patent Literature 1). The so-called angle multiplex recording system, in which different page data are displayed on a spatial light modulator while changing an incidence angle of a reference beam to an optical information recording medium and multiplex recording is conducted, is described in JP-A-2004-272268. In addition, a technique of shortening the spacing between adjacent holograms by condensing a signal beam with a lens and disposing an aperture (spatial filter) in its beam waist is described in JP-A-2004-272268. Furthermore, as for the hologram recording technique, there is, for example, WO2004-102542 (Patent Literature 2). An example using a shift multiplex system is described in WO2004-102542. In one spatial light modulator, a beam from inner side pixels is used as a signal beam and a beam from outer side ring-shaped pixels is used as a reference beam. Both beams are condensed onto an optical information recording medium by using the same lens. A hologram is recorded by causing interference between the signal beam and the reference beam near a focus plane of the lens.

Furthermore, for example, in JP-A-6-84762 (Patent Literature 3), there is the following description. "At the time of hologram recording, a monitor beam 40 differing in wavelength from a reference beam 18 and an object beam 28 is incident on a prism 16 obliquely. A hologram recording medium 17 is irradiated with the monitor beam 40. A part of the monitor beam 40 reflected by an inner face of the hologram recording medium 17 is diffracted by a formed hologram. The monitor beam 40 that is not diffracted is transmitted by the hologram recording medium 17, emitted from an oblique plane on the opposite side of the prism 16, and detected by a detector 31. The recording state of the hologram is detected by detecting at least one of the diffracted beam and the non-diffracted beam of the monitor beam 40. The exposure condition can be optimized on the basis of the detected recording state of the hologram."

CITATION LIST

Patent Literature

PATENT LITERATURE 1: JP-A-2004-272268
PATENT LITERATURE 2: WO2004-102542
PATENT LITERATURE 2: JP-A-6-84762

SUMMARY OF INVENTION

Technical Problem

By the way, at the time of hologram information recording, pre-exposure processing or post-exposure processing called cure is needed. However, an optimum cure time changes depending upon an environment at the time of information recording. Therefore, it is difficult to conduct optimum cure, resulting in a problem in putting a holographic memory to practical use.

In Patent Literature 3, cure processing in a device for storing information in a holographic memory is not considered at all. Especially, the pre-exposure processing is not considered at all.

An object of the present invention is to provide a technique that makes optimum cure possible by adjusting the cure time in real time when recording information.

Solution to Problem

The problem to be solved by the invention can be solved by the invention stated in claims.

Advantageous Effects of Invention

According to the present invention, it becomes possible to conduct suitable cure irrespective of the environment at the time of recording by adjusting cure time in real time when conducting the pre-exposure processing. Or when conducting the post-exposure processing, it becomes possible to reduce excessive cure time and prevent insufficient cure.

Other objects, features and advantages of the present invention will become apparent from ensuing description of embodiments of the present invention with reference to the accompanying drawings.

DESCRIPTION OF EMBODIMENTS

Embodiments of the present invention will be described with reference to the accompanying drawings.

The description is conducted for embodiments. However, it is apparent to those skilled in the art that the present invention is not restricted to the embodiments, but various changes and modifications can be made without departing from the spirit and scopes of appended claims of the present invention.

Figure 2:
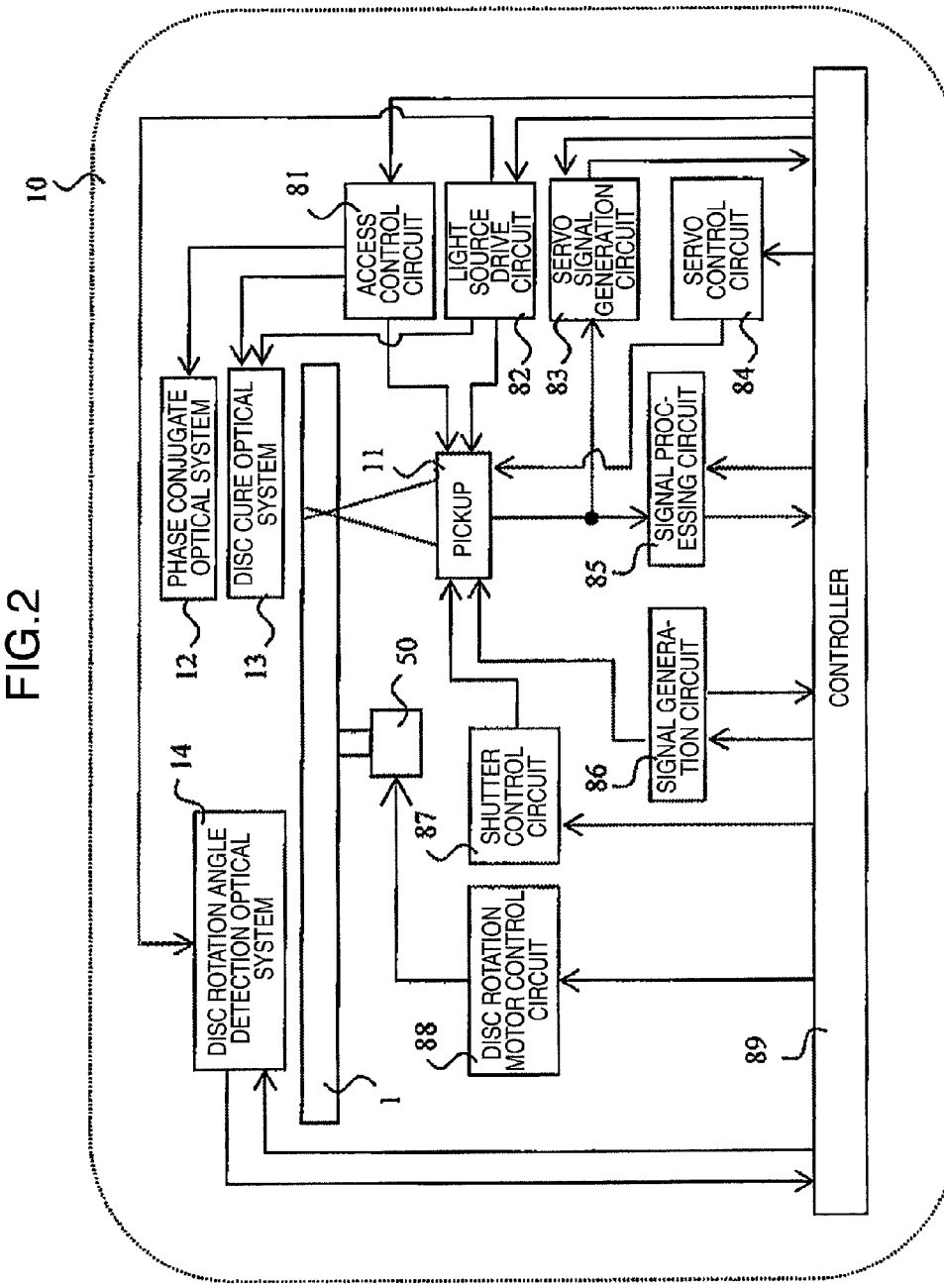
FIG. 2 is a configuration diagram showing an embodiment of an optical information recording and reproduction device.

FIG. 2 is a block diagram showing a configuration example of a recording and reproduction device of an optical information recording medium for recording and/or reproducing digital information by utilizing holography.

An optical information recording and reproduction device 10 includes a pickup 11, a phase conjugate optical system 12, a disc cure optical system 13, a disc rotation angle detection optical system 14, and a rotation motor 50. An optical information recording medium 1 is configured to be able to be rotated by the rotation motor 50.

The pickup 11 functions to emit a reference beam and a signal beam to the optical information recording medium 1 and record digital information in the optical information recording medium by utilizing holography. At this time, an information signal to be recorded is sent into a spatial light modulator in the pickup 11 via a signal generation circuit 86 by a controller 89, and the signal beam is modulated by the spatial light modulator.

When reproducing information recorded in the optical information recording medium 1, a phase conjugate beam of the reference beam emitted from the pickup 11 is generated in the phase conjugate optical system 12. Here, the phase conjugate beam is a light wave which advances in an opposite direction while holding the same wave surface as that of an input beam. A reproduced beam reproduced by using the phase conjugate beam is detected by a photo-detector included in the pickup 11 and described later, and a signal is reproduced by a signal processing circuit 85.

Irradiation time of the reference beam and the signal beam with which the optical information recording medium 1 is irradiated can be adjusted by the controller 89 which controls opening/closing time of a shutter in the pickup 11 via a shutter control circuit 87.

The disc cure optical system 13 functions to generate a light beam to be used in pre-cure and post-cure of the optical information recording medium 1. The pre-cure is pre-exposure processing in which a desired position is irradiated with a predetermined light beam before the desired position is irradiated with the reference beam and the signal beam, when recording information in the desired position in the optical information recording medium 1. The post-cure is post-exposure processing in which a desired position is irradiated with a predetermined light beam to make incremental recording in the desired position impossible, after information is recorded in the desired position in the optical information recording medium 1.

The disc rotation angle detection optical system 14 is used to detect a rotation angle of the optical information recording medium 1. When adjusting the optical information recording medium 1 to a predetermined rotation angle, it is possible to detect a signal corresponding to a rotation angle by using the disk rotation angle detection optical system 14 and cause the controller 89 to control the rotation angle of the optical information recording medium 1 via a disc rotation motor control circuit 88 by using the detected signal.

A light source drive circuit 82 supplies predetermined light source drive currents to light sources in the pickup 11, the disc cure optical system 13 and the disc rotation angle detection optical system 14. Each light source can emit a light beam with a predetermined light quantity.

Furthermore, each of the pickup 11 and the disc cure optical system 13 has a mechanism capable of sliding a position in a radial direction of the optical information recording medium 1. Position control is exercised via an access control circuit 81.

By the way, the recording technique using the principle of angle multiplex of holography has a tendency in which the allowable error for deviation of reference beam angle becomes extremely small.

Therefore, it becomes necessary to provide a mechanism in the pickup 11 to detect a deviation quantity of a reference beam angle, cause a servo signal generation circuit 83 to generate a signal for servo control, and provide a servo mechanism in the optical information recording and reproduction device 10 to correct the deviation quantity via a servo control circuit 84.

Furthermore, as for the pickup 11, the disc cure optical system 13, and the disc rotation angle detection optical system 14, some optical system configurations or all optical system configurations may be collected into one and simplified.

Figure 3:
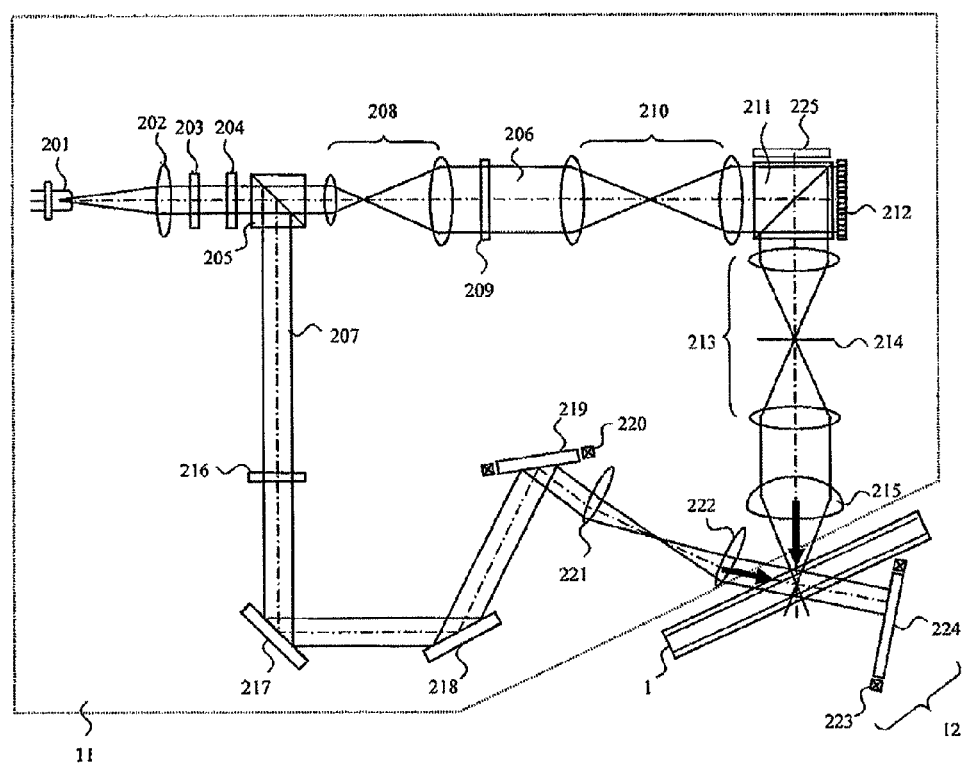
FIG. 3 is a diagram showing an embodiment of a pickup in the optical information recording and reproduction device (at the time of recording)

FIG. 3 shows a recording principle in an example of a basic optical system configuration of the pickup 11 in the optical information recording and reproduction device 10. A light beam emitted from a light source 201 is transmitted by a collimate lens 202, and incident on a shutter 203. When the shutter 203 is open, the light beam passes through the shutter 203. Then, the light beam is controlled in polarization direction by an optical element 204 formed of, for example, a half-wave plate, to have a desired ratio in light quantity ratio between p polarized light and s polarized light, and then is incident on a PBS (Polarization Beam Splitter) prism 205.

The light beam transmitted by the PBS prism 205 functions as a signal beam 206. After being expanded in light beam diameter by a beam expander 208, the light beam is transmitted by a phase mask 209, a relay lens 210, and a PBS prism 211, and is incident on a spatial light modulator 212.

The signal beam added with information by the spatial light modulator 212 is reflected by the PBS prism 211 and propagate through a relay lens 213 and a spatial filter 214. Thereafter, the signal beam is condensed onto the optical information recording medium 1 by an object lens 215.

On the other hand, a light beam reflected by the PBS prism 205 functions as a reference beam 207. The reference beam 207 is set to a predetermined polarization direction depending upon recording or reproduction by a polarization direction transform element 216, and then incident on a galvanometer mirror 219 via a mirror 217 and a mirror 218. Since the galvanometer mirror 219 can be adjusted in angle by an actuator 220, an incidence angle of the reference beam incident on the optical information recording medium 1 after passing through a lens 221 and a lens 222 can be set to a desired angle. By the way, an element for transforming a wave surface of the reference beam may be used instead of the galvanometer mirror in order to set an incidence angle of the reference beam.

In this way, the signal beam and the reference beam are incident on the optical information recording medium 1 so as to overlap with each other. As a result, an interference fringe pattern is formed in the optical information recording medium. Information is recorded by writing this pattern into the optical information recording medium. Furthermore, since the incidence angle of the reference beam incident on the optical information recording medium 1 can be changed by the galvanometer mirror 219, recording using angle multiplexing is possible.

Hereafter, in a hologram recorded in the same area by changing the reference beam angle, a hologram corresponding to each reference beam angle is referred to as page and a collection of pages angle-multiplexed in the same area is referred to as book.

Figure 4:
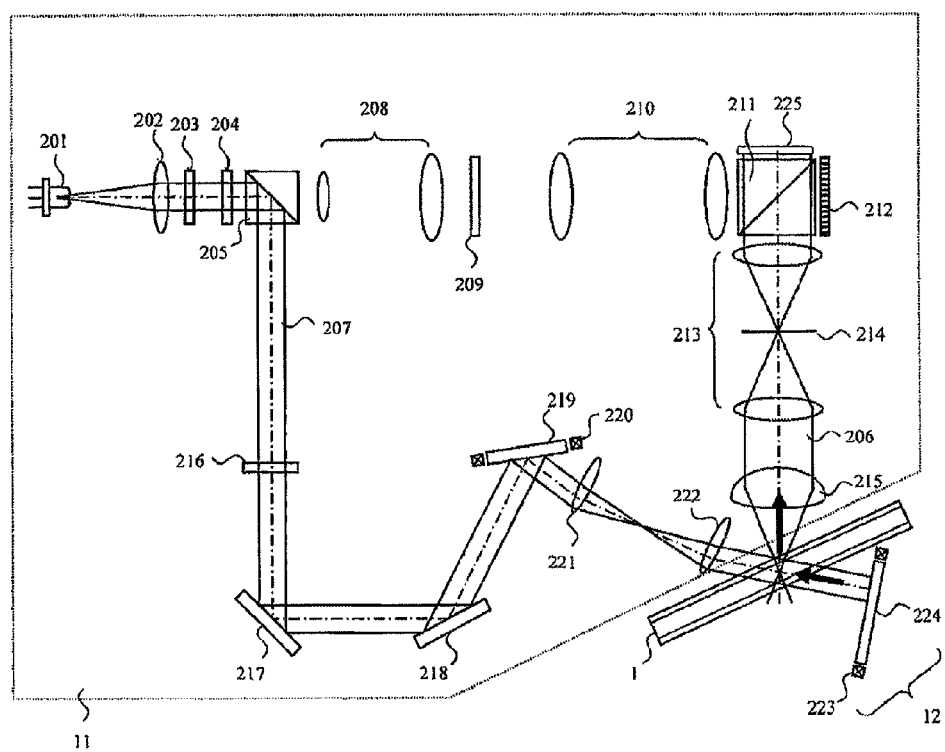
FIG. 4 is a diagram showing an embodiment of a pickup in the optical information recording and reproduction device (at the time of reproduction)

FIG. 4 shows a reproduction principle in an example of a basic optical system configuration of the pickup 11 in the optical information recording and reproduction device 10. When reproducing recorded information, the reference beam is incident on the optical information recording medium 1. A light beam transmitted by the optical information recording medium 1 is reflected by a galvanometer mirror 224 which can be adjusted in angle by an actuator 223. As a result, a phase conjugate beam is generated as described earlier.

The signal beam reproduced by using the phase conjugate beam propagates through the object lens 215, the relay lens 213 and the spatial filter 214. Thereafter, the signal beam is transmitted by the PBS prism 211 and incident on a photodetector 225. It is possible to reproduce the recorded signal.

Figure 5:
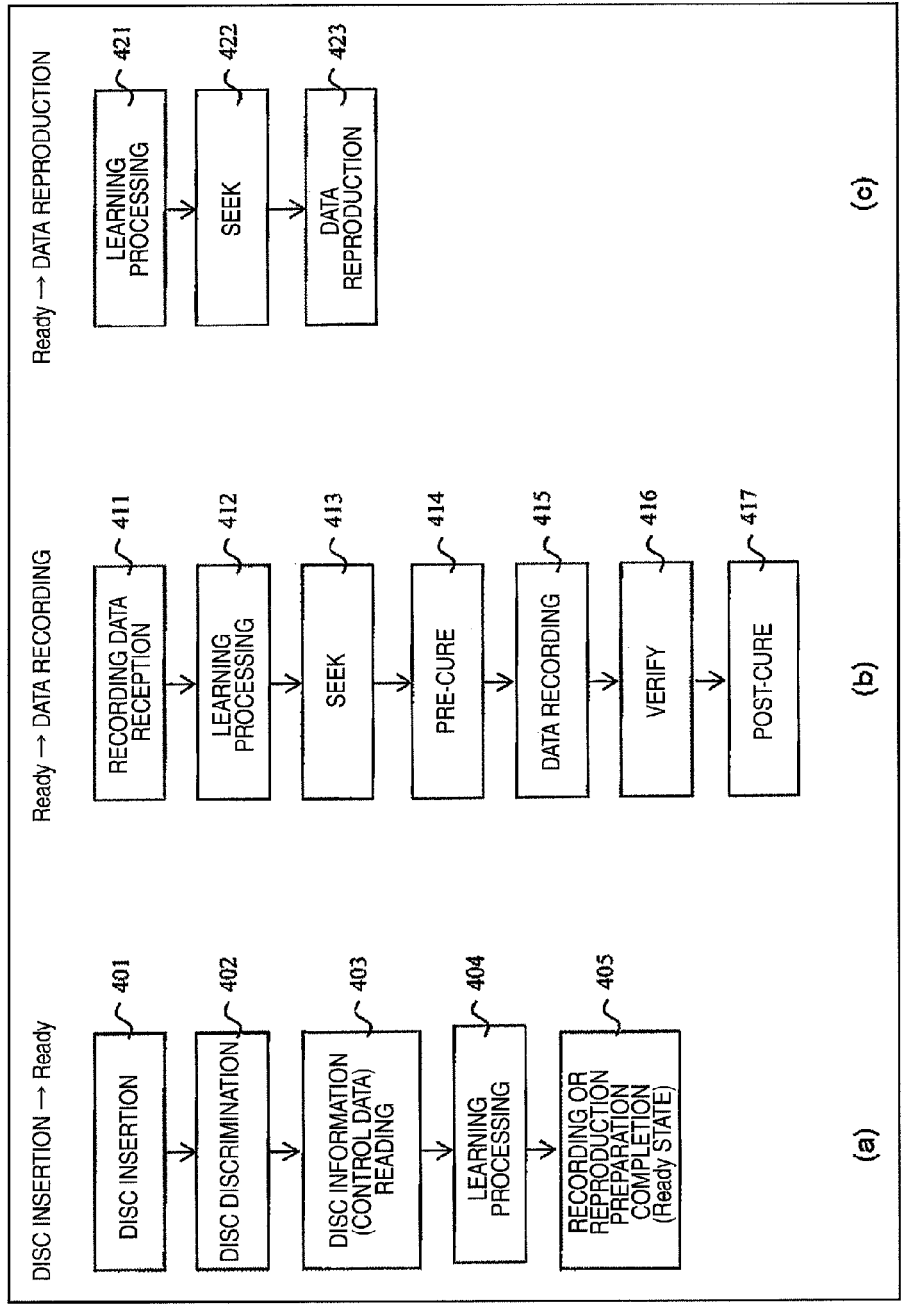
FIG. 5 is a diagram showing an embodiment of operation flows of the optical information recording and reproduction device.

FIG. 5 shows operation flows of recording and reproduction in the optical information recording and reproduction device 10. Here, flows concerning recording and reproduction utilizing holography will be described.

FIG. 5(a) shows a flow of operation conducted until preparation of recording or reproduction is completed after the optical information recording medium 1 is inserted into the optical information recording and reproduction device 10. FIG. 5(b) shows a flow of operation conducted until information is recorded into the optical information recording medium 1 since a preparation completion state. FIG. 5(c) shows a flow of operation conducted until information recorded into the optical information recording medium 1 is reproduced since the preparation completion state.

As shown in FIG. 5(a), a medium is inserted (401). The optical information recording and reproduction device 10 conducts disc discrimination to determine, for example, whether the inserted medium is a medium in which digital information is recorded or reproduced by utilizing holography (402).

If it is determined as a result of the disc discrimination that the inserted medium is a medium in which digital information is recorded or reproduced by utilizing holography, the optical information recording and reproduction device 10 reproduces control data provided in the optical information recording medium (403), and acquires information, for example, concerning the optical information recording medium and information, for example, concerning various setting conditions at the time of recording and reproduction.

After reproducing the control data, the optical information recording and reproduction device 10 conducts learning processing concerning various adjustments and the pickup 11 depending upon the control data (404), and the optical information recording and reproduction device 10 completes the preparation for recording or reproduction (405).

As for the operation flow until information recording since the preparation completion state, first, data to be recorded is received as shown in FIG. 5(b) (411), and information depending upon the data is sent into the spatial light modulator in the pickup 11.

Thereafter, various kinds of learning processing are conducted previously as occasion demands to make it possible to record high quality information in the optical information recording medium (412). Positions of the pickup 11 and the disc cure optical system 13 are disposed in predetermined positions of the optical information recording medium by seek operation (413).

Thereafter, a predetermined area is pre-cured by using the light beam emitted from the disc cure optical system 13 (414). Data is recorded by using the reference beam and the signal beam emitted from the pickup 11 (415).

After the data is recorded, data is verified as occasion demands (416), and post-cure is conducted by using the light beam emitted from the disc cure optical system 13 (417).

As for the operation flow until information reproduction since the preparation completion state, as shown in FIG. 5(c), various kinds of learning processing are conducted previously as occasion demands to make it possible to reproduce high quality information from the optical information recording medium (421). Thereafter, positions of the pickup 11 and the phase conjugate optical system 12 are disposed in predetermined positions of the optical information recording medium by seek operation (422).

Thereafter, the reference beam is emitted from the pickup 11, and information recorded in the optical information recording medium is reproduced (423).

In the ensuing description of embodiments, description will be omitted as for parts overlapping the above-described operation. Furthermore, description "cure" represents both pre-cure and post-cure.

Embodiment 1

A first embodiment in the present invention will now be described with reference to FIG. 1, FIG. 6 and FIG. 7.

Figure 6:
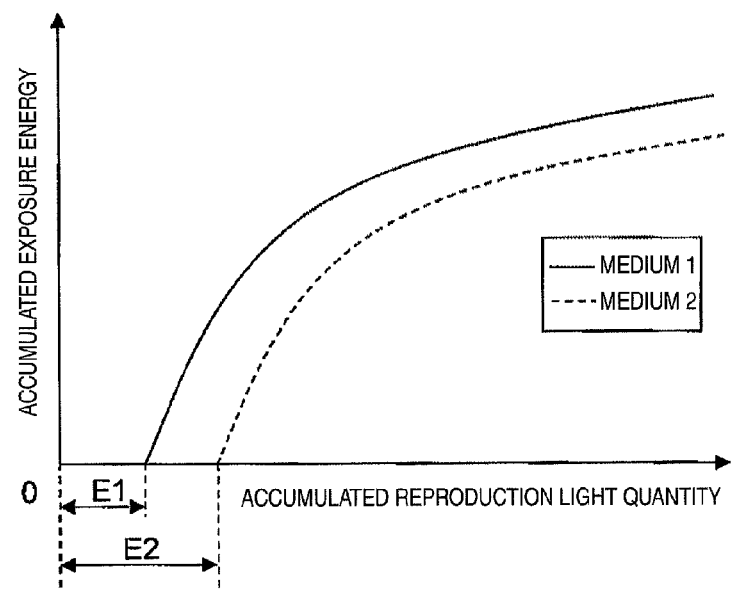
FIG. 6 is a schematic diagram showing examples of accumulated exposure energy and an accumulated reproduction light quantity in an optical information recording medium (embodiment 1)

FIG. 6 is a schematic diagram showing examples of accumulated exposure energy and an accumulated reproduction light quantity in the optical information recording medium (embodiment 1). The ordinate axis represents a value obtained by adding up reproduction light quantities from pages in the same book, i.e., an accumulated reproduction light quantity. The abscissa axis represents a value obtained by adding up exposure energy at the time of recording into the optical information recording medium, i.e., accumulated exposure energy. In FIG. 6, results of the accumulated reproduction light quantity and accumulated exposure energy in two different optical information recording media are schematically shown as an example. In the optical information recording medium using photopolymer which is generally used in holographic memories, a reproduction beam is not generated even if recording is conducted unless the optical information recording medium is irradiated with a beam for some determinate time. When recording a page, therefore, it is necessary to conduct processing called pre-cure in which the optical information recording medium is exposed to light for some determinate time, as pre-processing. Energy required for the pre-cure differs depending upon the optical information recording medium. For example, in case of FIG. 6, pre-cure with energy of E1 is needed for a medium 1 and pre-cure with energy of E2 is needed for a medium 2. In addition, even if the medium is the same, energy required for the pre-cure also changes depending upon differences in environment such as the temperature and humidity at the time of recording. In order to cope with these differences, it is necessary to change the pre-cure time depending upon a difference in medium and a difference in environment such as the temperature when conducting the pre-cure. As a matter of fact, however, it is difficult to incorporate pre-cure time into the optical information recording and reproduction device while taking differences in various environments into consideration. Therefore, a technique for adjusting the pre-cure time in real time is needed. The present invention relates to the adjustment of the cure time in real time.

Figure 7:
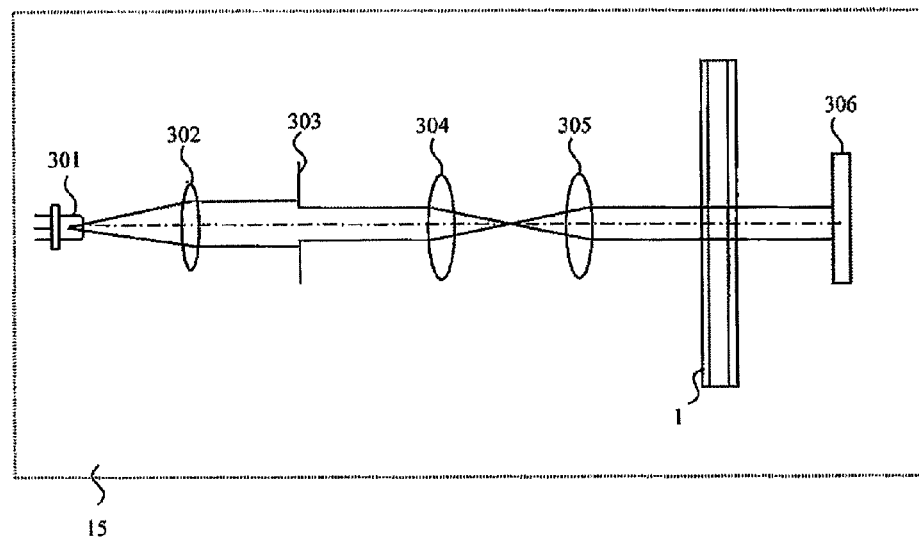
FIG. 7 is a diagram showing an embodiment of a disc cure optical system in the optical information recording and reproduction device (embodiment 1)

FIG. 7 shows an embodiment of a disc cure optical system in the optical information recording and reproduction device. A disc cure optical system 15 includes a cure light source 301, a collimate lens 302, an aperture 303, a lens 304, a lens 305, and a photo-detector 306. A laser beam emitted from the cure light source 301 is converted to parallel rays by the collimate lens 302. Thereafter, the parallel rays are prescribed to have a desired shape and size by the aperture 303. Thereafter, a 4-f system formed by the lens 304 and the lens 305 irradiates the optical information recording medium 1 with a beam having the shape and size prescribed by the aperture. A cure beam transmitted by the optical information recording medium 1 is detected by the photo-detector 306. Intensity of the transmitted beam detected by the photo-detector 306 tends to increase with time. This is because continuation of exposure causes monomer and photosensitive materials in the optical information recording medium to continue reaction and decreases the number of monomers and photosensitive materials and consequently absorption of the beam decreases. In the present invention, this change of transmitted light quantity is utilized and the pre-cure time is adjusted in real time. In other words, irradiation with the cure beam is continued until the intensity of the transmitted beam detected by the photo-detector 306 reaches some reference value, and irradiation with the laser beam is terminated when the reference value is exceeded. By doing so, it becomes possible to confirm the situation of the pre-cure in real time and adjust the pre-cure time. By the way, the reference value of the transmitted beam intensity for each medium may be retained previously in a drive, or may be recorded in a device that controls the drive or in the optical information recording medium itself.

Figure 1:
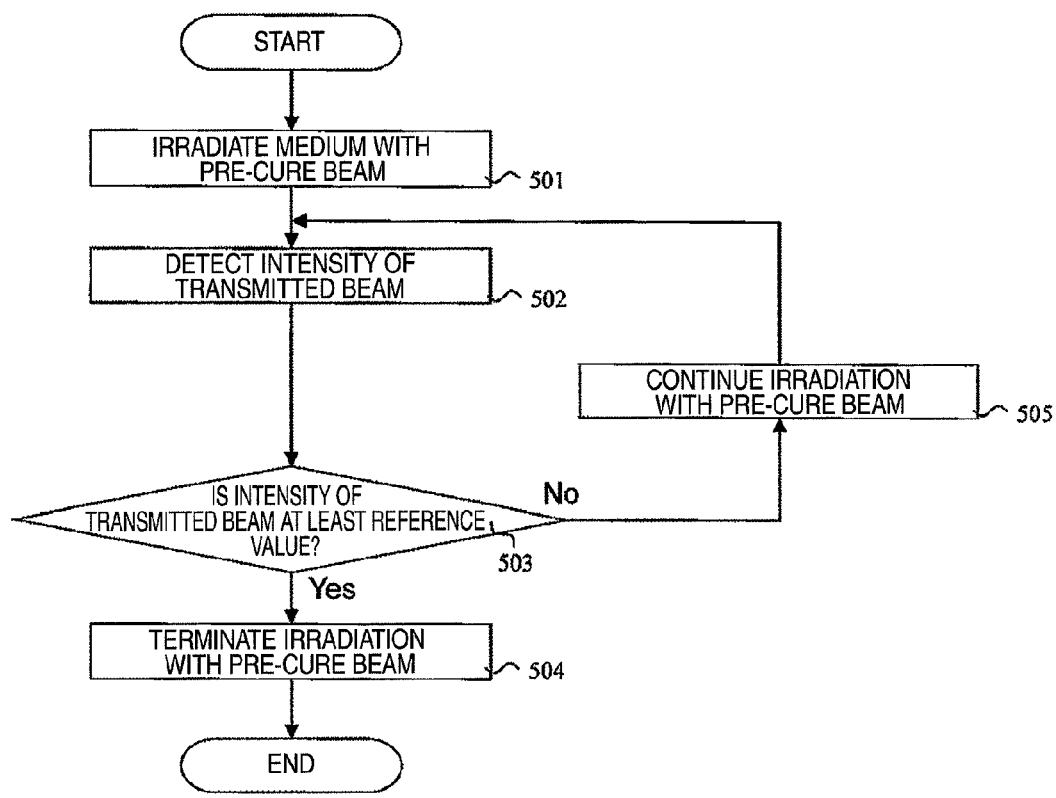
FIG. 1 is a flow chart showing an embodiment of an operation (embodiment 1)

FIG. 1 is a flow chart showing an embodiment of an operation at the time of pre-cure in the present invention. First, the optical information recording medium is irradiated with a pre-cure beam at 501. Then, a transmitted beam from the optical information recording medium is detected by the photo-detector at 502. Then, it is determined at 503 whether the intensity of the detected transmitted beam is at least the reference value. If the intensity of the transmitted beam is less than the reference value, irradiation with the pre-cure beam is continued at 505 and the processing returns to the operation at 502. If the intensity of the transmitted beam is at least the reference value, irradiation of the optical information recording medium with the pre-cure beam is terminated at 504.

In the present embodiment, it is not indispensable to the photo-detector whether there is a detection capability of two-dimensional data. Therefore, it is possible to use high speed devices such as the OEIC (Opto-Electronic Integrated Circuit) used in the Blu-ray Disc™ and the like. Therefore, there is a merit that high precision adjustment of the pre-cure time is possible. Furthermore, in a case where the optical information recording and reproduction device has a configuration capable of conducting recording and reproduction with respect to both the holographic memory and a conventional optical disc such as a Blu-ray Disc™, the OEIC utilized when conducting reproduction on the conventional optical disc can be utilized for detection of the transmitted beam of the cure beam as well.

In the embodiment, especially the pre-cure has been described. However, the present invention can be utilized in the post-cure as well, and the present invention is not restricted to the pre-cure. In a case where the present invention is executed in the pre-cure, it is possible to improve the recording quality because a difference in pre-cure time depending upon the medium can be coped with. In a case where the present invention is executed in the pre-cure, there is a merit that the speed up of recording becomes possible because wasteful irradiation in the post-cure can be reduced. Furthermore, there is a merit that it is possible to prevent monomer which becomes a noise source after recording from remaining, because it is possible to prevent incomplete post-cure.

In the ensuing description of embodiments, description of parts common to those in the present embodiment will be omitted.

Embodiment 2

A second embodiment in the present invention will now be described with reference to FIG. 8.

Figure 8:
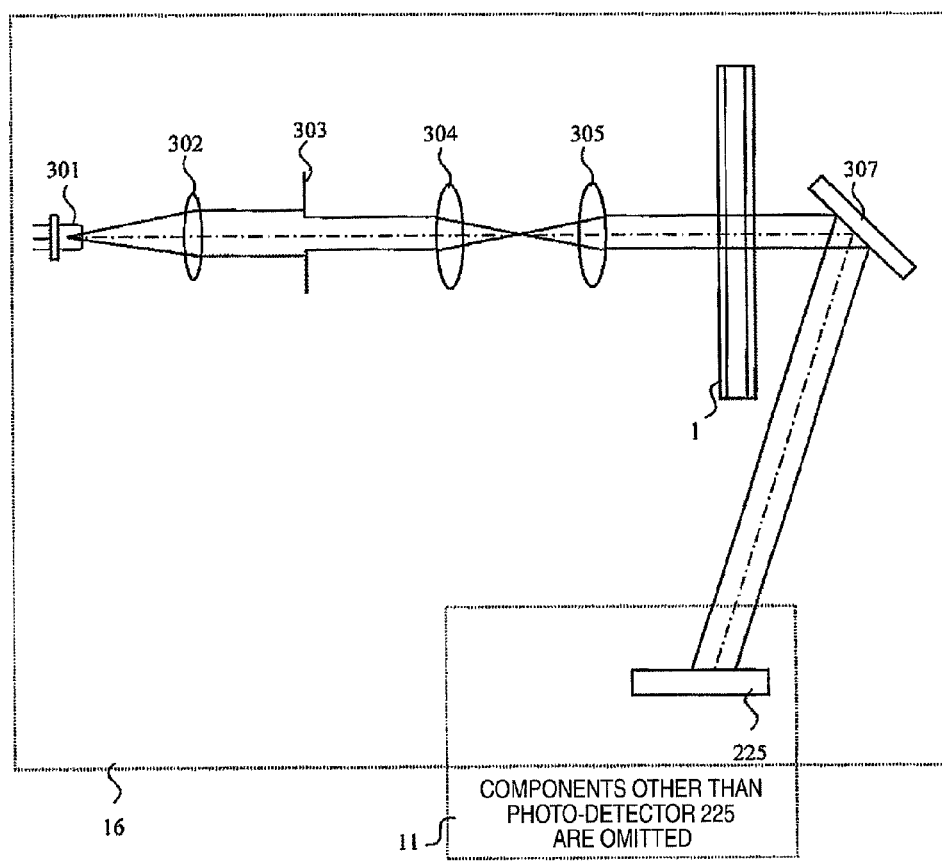
FIG. 8 is a diagram showing an embodiment of a disc cure optical system in the optical information recording and reproduction device (embodiment 2)

FIG. 8 shows an embodiment of a disc cure optical system in the optical information recording and reproduction device. A disc cure optical system 16 includes a cure light source 301, a collimate lens 302, an aperture 303, a lens 304, a lens 305, a mirror 307, and a photo-detector 225 in the pickup 11. A laser beam emitted from the cure light source 301 is converted to parallel rays by the collimate lens 302, and then prescribed to have a desired shape and a desired size by the aperture 303. Thereafter, a 4-f system formed of the lens 304 and the lens 305 irradiates the optical information recording medium 1 with a beam having the shape and size prescribed by the aperture. A cure beam transmitted by the optical information recording medium 1 is reflected by the mirror 307. The photo-detector 225 in the pickup 11 is irradiated with the reflected beam. Intensity of the transmitted beam detected by the photo-detector 225 has a tendency to increase with time. This is because continuation of exposure causes monomer and photosensitive materials in the optical information recording medium to continue reaction and decreases the number of monomers and photosensitive materials and consequently absorption of the beam decreases. In the present invention, this change of transmitted light quantity is utilized and the pre-cure time is adjusted in real time. In other words, irradiation with the cure beam is continued until the intensity of the transmitted beam detected by the photo-detector 225 reaches some reference value, and irradiation with the laser beam is terminated when the reference value is exceeded. By doing so, it becomes possible to confirm the situation of the pre-cure in real time and adjust the pre-cure time. By the way, the reference value of the transmitted beam intensity for each medium may be retained previously in a drive, or may be recorded in a device that controls the drive or in the optical information recording medium itself.

In the present embodiment, the pickup and the disc cure optical system share the photo-detector. Therefore, there is a merit that it is possible to decrease the number of components and shrink the size of the device.

In the ensuing description of embodiments, description of parts common to those in the present embodiment will be omitted.

Embodiment 3

A third embodiment in the present invention will now be described with reference to FIG. 9 and FIG. 10. In the present embodiment, a technique for learning the reference value of the transmitted beam intensity which becomes a criterion for finishing the pre-cure, before disc recording or periodically will be described.

Figure 9:
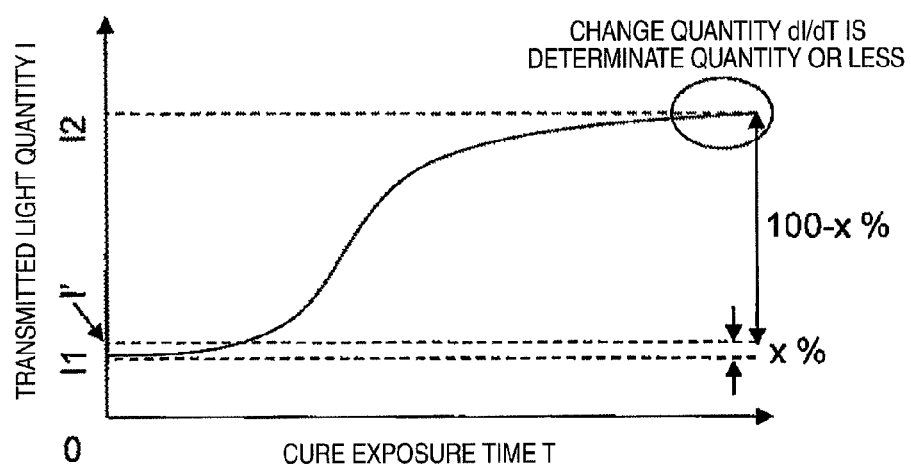
FIG. 9 is a schematic diagram showing an example of a relation between cure exposure time and transmitted light quantity (embodiment 3)

FIG. 9 is a schematic diagram showing an example of a relation between cure exposure time and transmitted light quantity. For example, in a case where a reference value of transmitted light intensity that indicates the pre-cure termination is learned, a recording area for learning is previously provided on the disc and movement to the recording area for learning is first conducted. Thereafter, an initial value 11 of the transmitted beam in a case where the cure beam is applied to the recording area for learning and a saturation value 12 in a case where the cure beam is continued to be applied are detected. As for a method for determining the saturation value 12, for example, a light quantity I at time when a displacement quantity dI/dT of a transmitted light quantity I for some time dT has become a definite quantity or less may be set as 12. At this time, a reference value I' of the transmitted light quantity can be determined, for example, by the following Expression (1).

$$I' = (1 - x/100) \times I1 + x/100 \times I2 \quad (1)$$

Here, x specifies a ratio of a displacement from the initial value I1 of the transmitted light quantity I to the reference value I' to the whole displacement of the transmitted light quantity. The ratio x may be previously retained in the optical information recording and reproduction device, a device that controls the optical information recording and reproduction device, or the optical information recording medium. Or the user may be caused to input the ratio x at the time of recording. By the way, the method for determining the reference value of the transmitted quantity is not restricted to the above-described method, but the reference value may be calculated by using a different method. For example, a light quantity at time when dI/dT for a displacement quantity of the transmitted light quantity I from the initial value I1 has become at least a determinate quantity may be set as the reference value I'.

Figure 10:
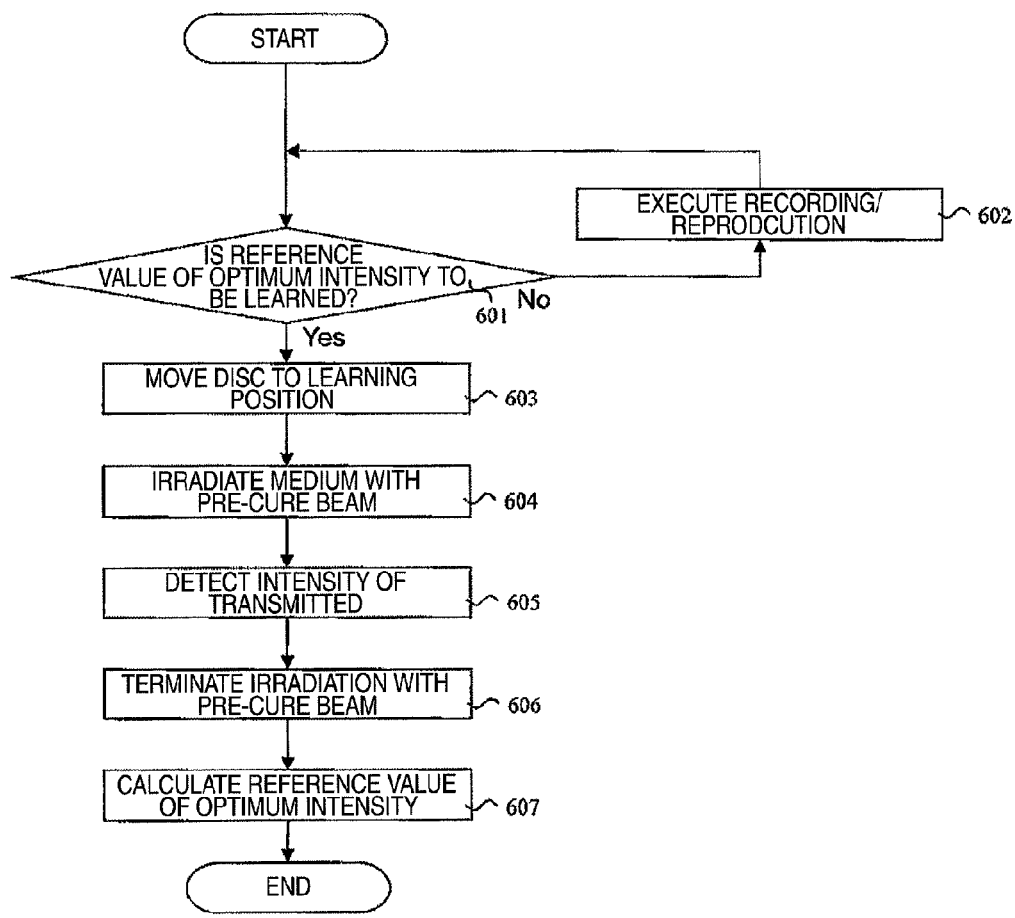
FIG. 10 is a flow chart showing an embodiment of operation (embodiment 3)

FIG. 10 is a flow chart showing an embodiment of operation at the time of pre-cure in the present invention. First, it is determined at 601 whether to conduct learning of the reference value of the transmitted beam intensity that indicates the pre-cure termination.

In case where learning of the reference value of the transmitted beam intensity is not to be conducted, ordinary recording and reproduction are executed at 602, and the processing returns to determination whether to conduct learning of the reference value of the transmitted beam intensity at 601 again. In the case of learning of the reference value of the transmitted beam intensity, the disc is moved to the area for learning at 603. Thereafter, the optical information recording medium is irradiated with the pre-cure beam at 604. A transmitted beam from the optical information recording medium is detected by the photo-detector at 605. After the optical information recording medium is irradiated with the pre-cure beam for a sufficient time, irradiation with the pre-cure beam is terminated at 606. An optimum reference value of the transmitted beam intensity is calculated according to the above-described method at 607.

In the present embodiment, it is possible to cope with differences in transmittance and absorbance of the medium caused by differences in environment such as temperature and humidity. There is a merit that tolerance to an environment change can be enhanced.

In the ensuing description of embodiments, description of parts common to those in the present embodiment will be omitted.

Embodiment 4

A fourth embodiment in the present invention will now be described with reference to FIG. 11 and FIG. 12.

Figure 11:
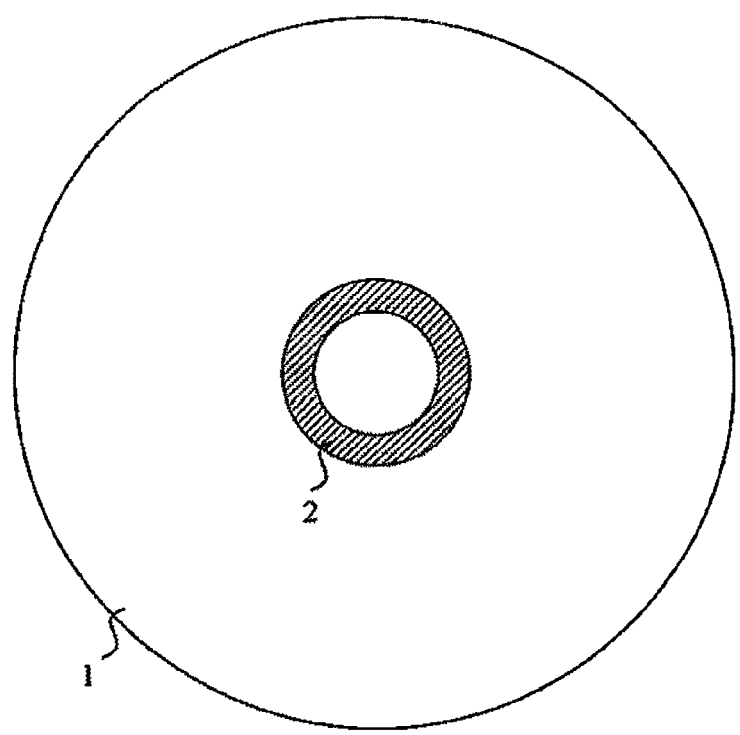
FIG. 11 is a diagram showing an embodiment of the optical information recording medium (embodiment 4)

FIG. 11 shows an embodiment of the optical information recording medium. The present embodiment has a feature that an information recording area 2 is provided, for example, in an inner circumference part of the optical information recording medium 1. The initial value and saturation value of the transmitted beam intensity and the reference value which becomes a criterion of the cure termination are retained in the information recording area 2. When executing the cure, an information reproduction circuit which will be described later adjusts the cure time by referring to these values. As for a method for adjusting the cure time, the methods of the above-described embodiments 1 to 3 are utilized. By the way, the position of the information recording area is not restricted to the inner circumference part of the optical information recording medium, but may be located in any place as long as the position is located in the optical information recording medium. Furthermore, time that becomes a criterion of the actual cure may be previously recorded in the information recording area 2. As for a method for retaining the transmitted beam intensity information in the information recording area 2, the transmitted beam intensity information may be retained using a difference in pit or crystallinity in the same way as the conventional optical disc represented by the Blu-ray Disc™, may be retained by utilizing holography, or may be retained by using a bar code or the like.

Figure 12:
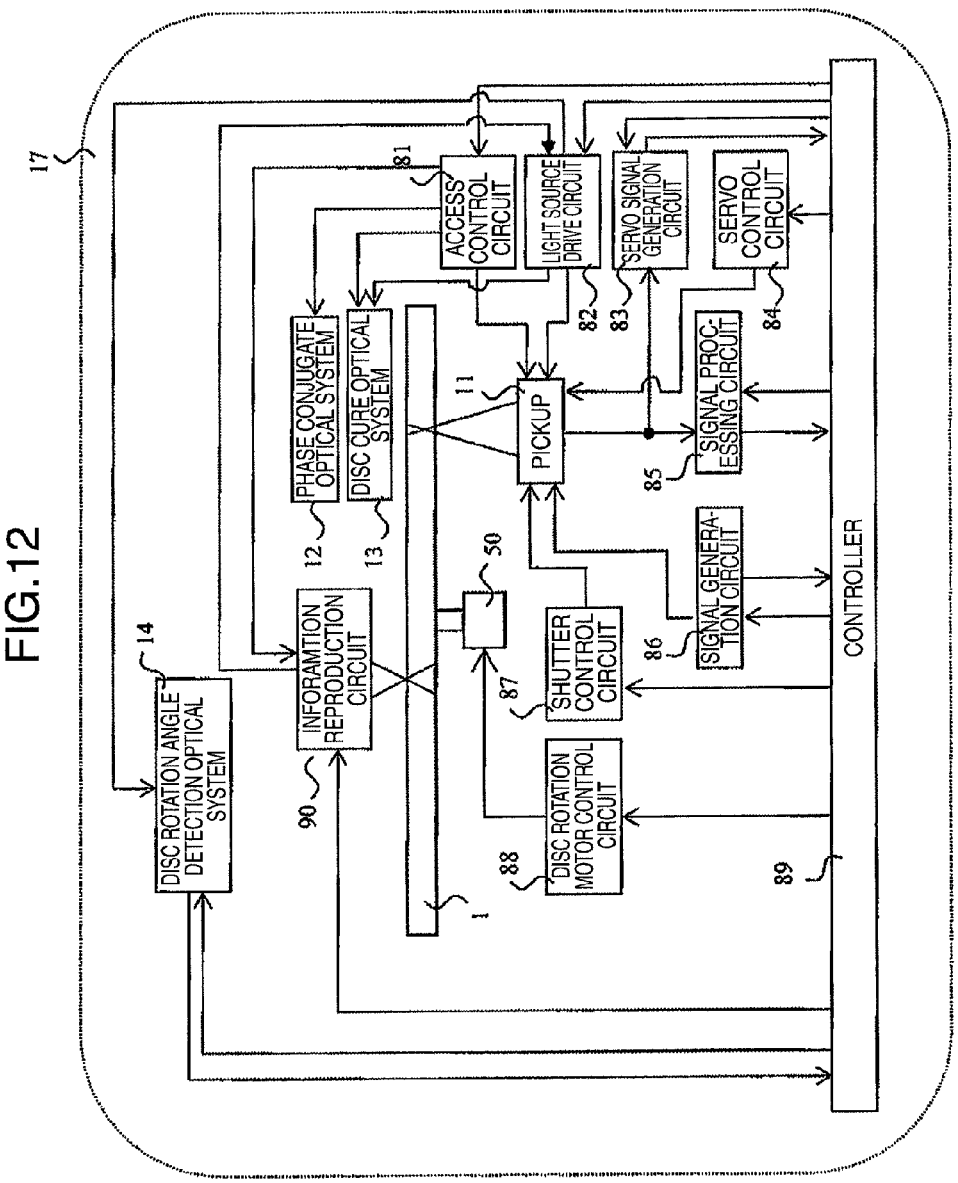
FIG. 12 is a configuration diagram showing an embodiment of the optical information recording and reproduction device (embodiment 4)
Figure 13:
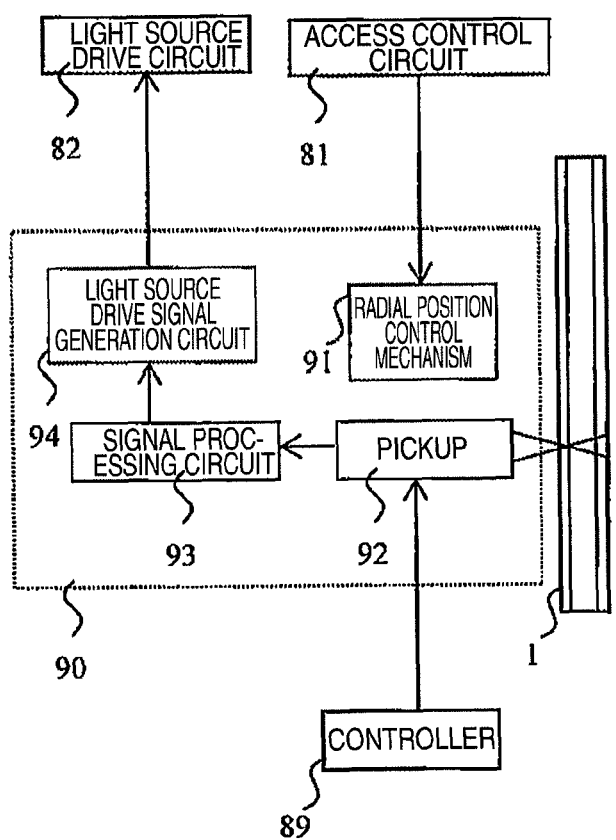
FIG. 13 is a configuration diagram showing an embodiment of an information reproduction circuit in the optical information recording and reproduction device (embodiment 4)

FIG. 12 is a configuration diagram showing an embodiment of the optical information recording and reproduction device. FIG. 13 shows an embodiment of an information reproduction circuit in the optical information recording and reproduction device. FIG. 12 differs in configuration from FIG. 2 in that an information reproduction circuit 90 is added. When executing the cure, a pickup 92 in the information reproduction circuit 90 receives a command from the controller 89 and reads the transmitted beam intensity information recorded in the optical information recording medium 1. In the information reproduction circuit 90, a radial position control mechanism 91 capable of sliding the position in the radial direction of the optical information recording medium 1 is provided, and position control is exercised via the access control circuit 81. In the information reproduction circuit 90, a signal processing circuit 93 processes a signal reproduced by the pickup 92, and then a light source drive signal generation circuit generates a signal for controlling the light source drive circuit 82 and sends the signal to the light source drive circuit 82. The light source drive circuit 82 adjusts drive time of a light source in the disc cure optical system 13. By the way, other operations are the same as those in the description of FIG. 2, and consequently description of them will be omitted.

In the present embodiment, it is possible to provide each optical information recording medium with transmitted beam intensity information. Therefore, there is a merit that it is possible to cope with a difference in cure condition of every optical information recording medium in detail.

In the ensuing description of embodiments, description for parts common to the present embodiment will be omitted.

Embodiment 5

A fifth embodiment in the present invention will now be described with reference to FIG. 14.

Figure 14:
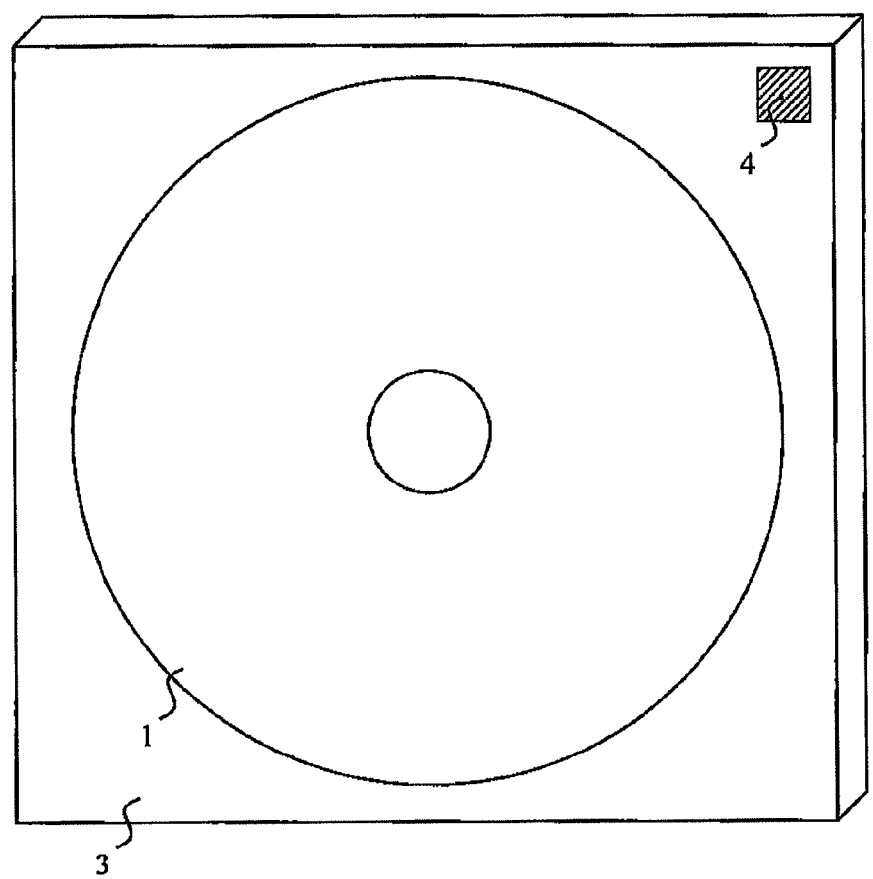
FIG. 14 is a diagram showing an embodiment of an optical information recording medium (embodiment 5)

FIG. 14 shows an embodiment of the optical information recording medium. The present embodiment has a feature that an information recording circuit 4 is provided in an optical information recording medium cartridge 3 for preventing the optical information recording medium 1 from unnecessary exposure.

An initial value and a saturation value of the transmitted beam intensity and a reference value that becomes a criterion of cure termination are retained in the information recording circuit 4. When executing the cure, the above-described information reproduction circuit adjusts the cure time by referring to these values. As for a method for adjusting the cure time, for example, the above-described methods of the embodiments 1 to 3 are used. By the way, the position of the information recording circuit is not restricted to the illustrated position, but may be in an arbitrary place as long as the position is located in the optical information recording medium cartridge. As for a method for retaining the transmitted beam intensity information in the information recording circuit 4, a method for using a chip capable of conducting wireless communication such as, for example, an RFID (Radio Frequency Identification) tag, or an IC chip that conducts contact type reading is conceivable.

The optical information recording and reproduction device can be implemented with a configuration similar to that shown in FIG. 12. In the case of the present embodiment, the position adjustment in the information reproduction circuit 90 can be omitted. Therefore, communication between the access control circuit 81 and the information reproduction circuit 90 can be omitted. By the way, in a case where the RFID is used, the information reproduction circuit 90 needs to include an RFID reader capable of reading an RFID tag. In a case where a contact type IC chip is used, the information reproduction circuit 90 needs to be a device capable of reading a contact type IC chip and needs to be disposed in a position that beings about contact with the IC chip when inserted into the cartridge.

In the present embodiment, an area in the optical information recording medium is not used to retain the transmitted beam intensity information. Therefore, there is a merit that it is not necessary to reduce the recording area. Furthermore, there is a merit that it is not necessary to conduct processing such as position alignment of the optical information recording medium and the information reproduction circuit.

In the ensuing description of an embodiment, description for parts common to the present embodiment will be omitted.

By the way, the above-described embodiments can also be represented as follows: an optical information recording device for recording information in a holographic memory includes a light source for generating a signal beam and a reference beam, a spatial light modulator for adding information to the signal beam generated by the light source, an exposure processing light source for conducting pre-exposure processing on the holographic memory, and a detector for detecting a beam emitted from the exposure processing light source and transmitted by the holographic memory, and the pre-exposure processing is controlled depending upon a detection result of the detector.

Embodiment 6

A sixth embodiment in the present invention will now be described with reference to FIG. 15. In the present embodiment, a technique for adjusting cure time by using the transmitted light quantity of the cure beam at the time of the post cure as well will be described.

Figure 15:
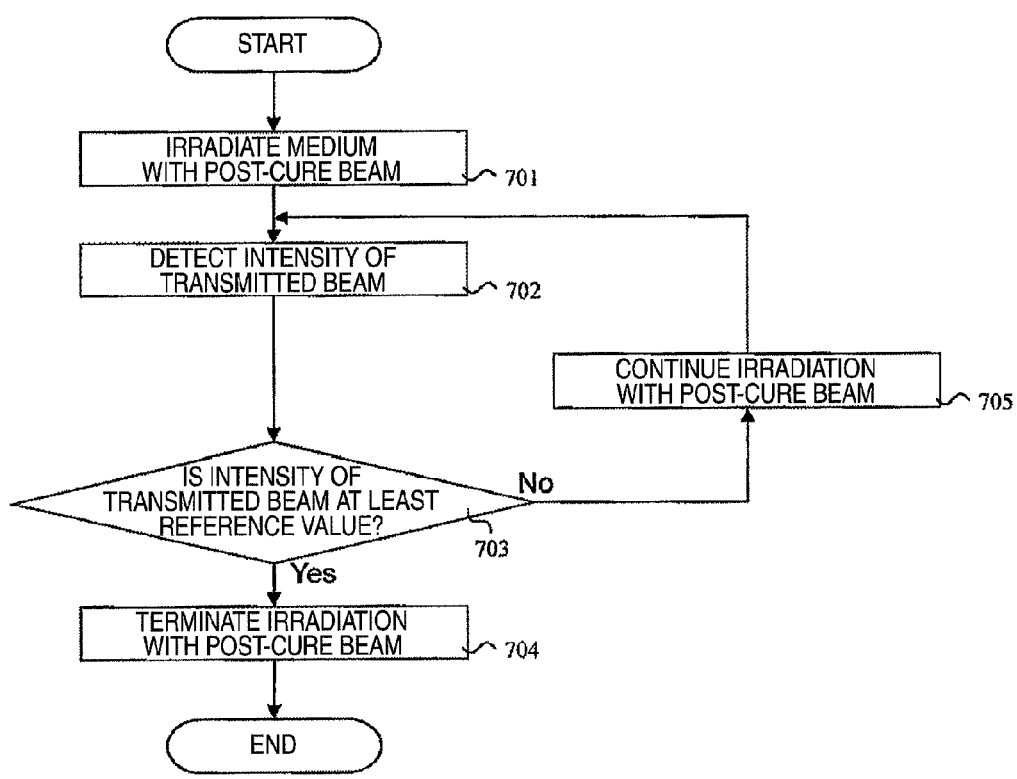
FIG. 15 is a flow chart showing an embodiment of operation (embodiment 6).

FIG. 15 is a flow chart showing an embodiment of an operation at the time of the post cure in the present invention. First, the optical information recording medium is irradiated with a post cure beam at 701. Then, a transmitted beam from the optical information recording medium is detected by the photo-detector at 702. Then, it is determined at 703 whether the intensity of the detected transmitted beam is at least the reference value. If the intensity of the transmitted beam is less than the reference value, irradiation with the post-cure beam is continued at 705 and the processing returns to the operation at 702. If the intensity of the transmitted beam is at least the reference value, irradiation of the optical information recording medium with the post-cure beam is terminated at 704.

In the present embodiment, there is a merit that the speed up of recording becomes possible because wasteful irradiation in the post-cure can be reduced. Furthermore, there is a merit that it is possible to prevent monomer which becomes a noise source after recording from remaining, because it is possible to prevent incomplete post-cure.

REFERENCE SIGNS LIST

1: Optical information recording medium
2: Information recording area
3: Optical information recording medium cartridge
4: Information recording circuit
10: Optical information recording and reproduction device
11: Pickup
12: Phase conjugate optical system
13: Disc cure optical system
14: Disc rotation angle detection optical system
15: Disc cure optical system
16: Disc cure optical system
17: Optical information recording and reproduction device
50: Rotation motor
81: Access control circuit
82: light source drive circuit
83: Servo signal generation circuit
84: Servo control circuit
85: Signal processing circuit
86: Signal generation circuit
87: Shutter control circuit
88: Disc rotation motor control circuit
89: Controller
90: Information reproduction circuit 91: Radial position control mechanism
92: Pickup
93: Signal processing circuit
94: Light source drive signal generation circuit
201: Light source
202: Collimate lens
203: Shutter
204: Half-wave plate
205: Polarization beam splitter
206: Signal beam
207: Reference beam
208: Beam expander
209: Phase mask
210: Relay lens
211: Polarization beam splitter
212: Spatial light modulator
213: Relay lens
214: Spatial filter
215: Object lens
216: Polarization direction transform element
217: Mirror
218: Mirror
219: Mirror
220: Actuator
221: Lens
222: Lens
223: Actuator
224: Mirror
225: Photo-detector
301: Cure light source
302: Collimate lens
303: Aperture
304: Lens
305: Lens
306: Photo-detector
307: Mirror

The invention claimed is:

1. An optical information recording and reproduction device for recording and reproducing information by utilizing holography, the optical information recording and reproduction device comprising:
   a first light source;
   a mechanism for forming a reference beam from the first light source;
   a mechanism for forming a signal beam from the first light source;
   a spatial light modulator for adding information to the signal beam;
   a mechanism for irradiating an optical information recording medium with the signal beam added with information;
   a mechanism for irradiating the optical information recording medium with the reference beam:
   a first detection mechanism for detecting a signal beam reproduced by irradiating the optical information recording medium with the reference beam;
   a mechanism for conducting signal processing of reproducing information by processing information received by the first detection mechanism as a beam;
   a second light source;
   a mechanism for forming a cure beam from the second light source;
   a cure beam irradiation mechanism for irradiating the recording medium with the cure beam; and
   a second detection mechanism for detecting the cure beam transmitted by the recording medium,
   the cure beam irradiation mechanism adjusting irradiation time to terminate irradiation when intensity of the transmitted beam detected by the second detection mechanism has reached a predetermined reference value, wherein the reference value is previously retained in an optical information recording medium, and the reference value is referred to at time of cure.

2. The optical information recording and reproduction device according to claim 1, wherein the second detection mechanism functions as the first detection mechanism at the time of information reproduction as well.

3. The optical information recording and reproduction device according to claim 1, wherein the reference value is previously retained in the optical information recording and reproduction device, and the reference value is referred to at time of cure.

4. The optical information recording and reproduction device according to claim 1, wherein the reference value is previously retained in a device that controls the optical information recording and reproduction device, and the reference value is referred to at time of cure.

5. The optical information recording and reproduction device according to claim 1, wherein a reference value of intensity of a transmitted beam that becomes a criterion of termination of cure beam irradiation is previously calculated before information recording from an initial value and a saturation value of intensity of the transmitted beam detected by the second detection mechanism, and when recording information, irradiation time is adjusted to terminate irradiation when the intensity of the transmitted beam of the cure beam detected by the second detection mechanism has reached the reference value.

6. An optical information recording and reproduction method for recording and reproducing information by utilizing holography, the optical information recording and reproduction method comprising:
   a process for forming a reference beam from a first light source;
   a process for forming a signal beam from the first light source;
   a process for adding information to the signal beam;
   a process for irradiating an optical information recording medium with the signal beam added with information;
   a process for irradiating the optical information recording medium with the reference beam:
   a first detection process for detecting a signal beam reproduced by irradiating the optical information recording medium with the reference beam;
   a process for conducting signal processing of reproducing information by processing information received by the first detection process as a beam;
   a process for forming a cure beam from a second light source;
   a cure beam irradiation process for irradiating the recording medium with the cure beam; and
   a second detection process for detecting the cure beam transmitted by the recording medium,
   the cure beam irradiation process adjusting irradiation time to terminate irradiation when intensity of the transmitted beam detected in the second detection process has reached a predetermined reference value, wherein a reference value of intensity of a transmitted beam that becomes a criterion of termination of cure beam irradiation is previously calculated before information recording from an initial value and a saturation value of intensity of the transmitted beam detected in the second detection process, and when recording information, irradiation time is adjusted to terminate irradiation when the intensity of the transmitted beam of the cure beam detected in the second detection process has reached the reference value.

7. The optical information recording and reproduction method according to claim 6, wherein the second detection process functions as the first detection process at the time of information reproduction as well.

8. An optical information recording device for recording information by utilizing holography, the optical information recording device comprising:
- a mechanism for forming a signal beam;
- a spatial light modulator for adding information to the formed signal beam;
- a mechanism for irradiating an optical information recording medium with the signal beam added with information;
- a mechanism for forming a cure beam;
- a cure beam irradiation mechanism for irradiating the optical information recording medium with the formed cure beam; and
- a detection mechanism for detecting the cure beam transmitted by the optical information recording medium,
- the cure beam irradiation mechanism terminating the irradiation with the cure beam when intensity of the transmitted beam detected by the detection mechanism has reached a predetermined reference value, wherein the reference value is previously retained in an optical information recording medium, and the retained reference value is referred to when conducting curing.

9. The optical information recording device according to claim 8, wherein the reference value is previously retained in the optical information recording device or a device controlling the optical information recording device, and the retained reference value is referred to when conducting curing.

10. The optical information recording device according to claim 8, wherein a reference value of intensity of a transmitted beam that becomes a criterion of termination of cure beam irradiation is previously calculated on the basis an initial value and a saturation value of intensity of the transmitted beam detected by the detection mechanism, and when recording information, irradiation is terminated when the intensity of the transmitted beam of the cure beam detected by the detection mechanism has reached the reference value.

11. An optical information recording and reproduction device for recording and reproducing information by utilizing holography, the optical information recording and reproduction device comprising:
- a first light source;
- a mechanism for forming a reference beam from the first light source;
- a mechanism for forming a signal beam from the first light source;
- a spatial light modulator for adding information to the signal beam;
- a mechanism for irradiating an optical information recording medium with the signal beam added with information;
- a mechanism for irradiating the optical information recording medium with the reference beam:
- a first detection mechanism for detecting a signal beam reproduced by irradiating the optical information recording medium with the reference beam;
- a mechanism for conducting signal processing of reproducing information by processing information received by the first detection mechanism as a beam;
- a second light source;
- a mechanism for forming a cure beam from the second light source;
- a cure beam irradiation mechanism for irradiating the recording medium with the cure beam; and
- a second detection mechanism for detecting the cure beam transmitted by the recording medium,
- the cure beam irradiation mechanism adjusting irradiation time to terminate irradiation when intensity of the transmitted beam detected by the second detection mechanism has reached a predetermined reference value, wherein a reference value of intensity of a transmitted beam that becomes a criterion of termination of cure beam irradiation is previously calculated before information recording from an initial value and a saturation value of intensity of the transmitted beam detected by the second detection mechanism, and when recording information, irradiation time is adjusted to terminate irradiation when the intensity of the transmitted beam of the cure beam detected by the second detection mechanism has reached the reference value.

12. An optical information recording device for recording information by utilizing holography, the optical information recording device comprising:
- a mechanism for forming a signal beam;
- a spatial light modulator for adding information to the formed signal beam;
- a mechanism for irradiating an optical information recording medium with the signal beam added with information;
- a mechanism for forming a cure beam;
- a cure beam irradiation mechanism for irradiating the optical information recording medium with the formed cure beam; and
- a detection mechanism for detecting the cure beam transmitted by the optical information recording medium,
- the cure beam irradiation mechanism terminating the irradiation with the cure beam when intensity of the transmitted beam detected by the detection mechanism has reached a predetermined reference value, wherein a reference value of intensity of a transmitted beam that becomes a criterion of termination of cure beam irradiation is previously calculated on the basis an initial value and a saturation value of intensity of the transmitted beam detected by the detection mechanism, and when recording information, irradiation is terminated when the intensity of the transmitted beam of the cure beam detected by the detection mechanism has reached the reference value.

* * * * *